United States Patent [19]

Lucia

[11] 4,073,090
[45] Feb. 14, 1978

[54] SELF-RELEASING TREE COLLAR AND USE THEREOF IN A TREE TRUNK GUYING SYSTEM

[75] Inventor: Angelo Peter Lucia, Kent, Ohio

[73] Assignee: Tree Guying Systems, Inc., Kent, Ohio

[21] Appl. No.: 700,502

[22] Filed: June 28, 1976

[51] Int. Cl.² .................................................. A01G 17/04
[52] U.S. Cl. ........................................ 47/43; 119/106; 24/201 C; 24/201 TR; 24/263 R; 24/243 R
[58] Field of Search ........................................ 47/42–43, 47/7; 119/96, 106; 24/206, 16 PB, 20 R, 20 S, 20 TT, 20 EE, 201 C, 201 TR, 256, 257 R, 115 F, 230 AL, 230 AN, 21

[56] References Cited
U.S. PATENT DOCUMENTS

| 603,807 | 5/1898 | Abell | 47/7 |
|---|---|---|---|
| 2,612,139 | 9/1952 | Collins | 119/106 |
| 2,900,696 | 8/1959 | Bacon | 24/206 |
| 3,011,478 | 12/1961 | Kirby | 119/106 |
| 3,530,547 | 9/1970 | Robinson | 119/106 X |

FOREIGN PATENT DOCUMENTS

| 1,105,561 | 12/1955 | France | 47/43 |
|---|---|---|---|
| 67,577 | 5/1892 | Germany | 47/42 |
| 12,484 of | 1900 | United Kingdom | 47/43 |

Primary Examiner—Robert E. Bagwill
Attorney, Agent, or Firm—John J. Murphey

[57] ABSTRACT

A tree trunk guying system that permits the flow of vital tree-growing fluids along the cambium layer of the tree trunk and automatically detaches itself from the tree trunk after the tree becomes self-supporting makes use of a unique tree trunk-grasping collar featuring, first, a structure providing both adequate support for and minimal contact with the tree trunk and, second, means for disengaging the tree collar from the tree trunk after a predetermined period of time or predetermined expansion of the tree trunk.

15 Claims, 10 Drawing Figures

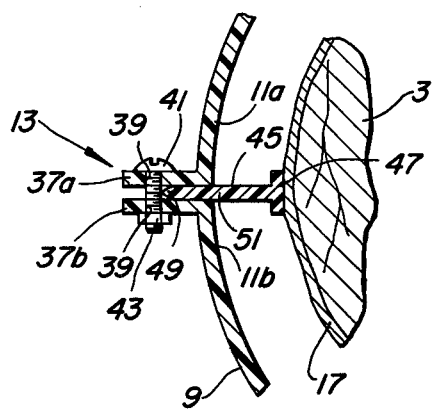
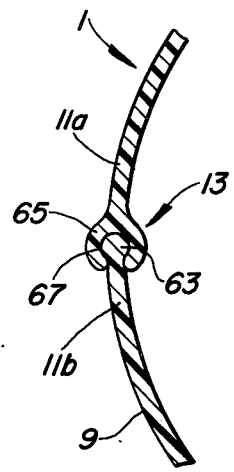
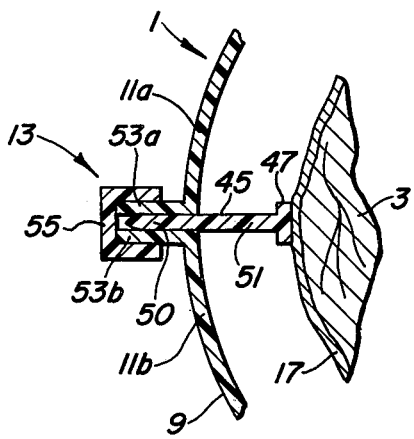
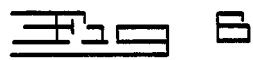
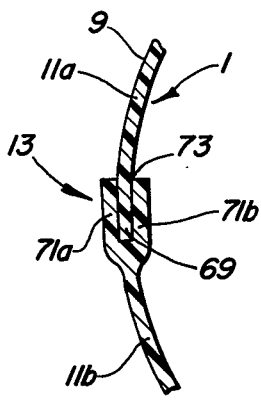
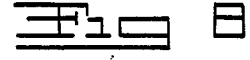

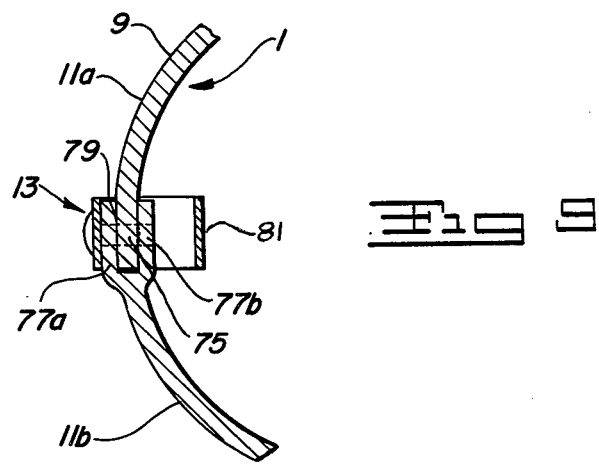
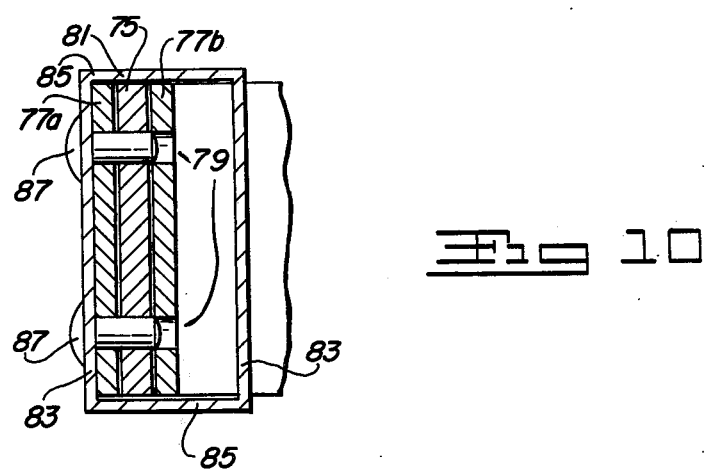

SELF-RELEASING TREE COLLAR AND USE THEREOF IN A TREE TRUNK GUYING SYSTEM

BACKGROUND OF THE INVENTION

1. Field of the Invention

This invention relates to the field of tree guying systems that generally comprise a tree trunk grasping collar and anchoring (guy) wires that extend therefrom to an immoveable surface or object such as the ground. These systems are utilized by the landscape contractors, arborists and tree nursery professions to provide additional support during wind storms to newly planted trees until their roots are firmly anchored to the ground by natural growth and they are self-supporting.

2. Description of the Prior Art

Tree guying systems are used to support young or newly transplanted trees whose roots have not had a chance to grow into the undisturbed earth sufficiently to prevent them from overturning or otherwise exposing their roots to the air under the influence of strong surface winds. Probably the crudest form of a tree guying system is a staff pounded into the ground next to the young tree trunk and lashed thereto with rope or other tying means. This practice has long since fallen from favor because the staff often disrupts and breaks vital root fibers of the already established tree and further causes the tree bark to abrade during contact with the staff, especially when the wind blows the tree back and forth. Later development involved removing the staff from adjacent the tree trunk and guying the tree with a series of wires or ropes that stretched from a collar around the tree trunk to some distant support to provide a more favorable environment to the roots.

Tree guying systems have been the subject of a number of patents. U.S. Pat. No. 720,667 to William Cartwright discloses a rigid collar fastened around the tree trunk and adapted for fastening to a vertical staff driven into the ground along side the trunk. Inside the collar, a second, yieldable concentric collar is placed fully around the tree trunk and held spaced apart from the main collar through a series of metal springs. This device presents two distinct disadvantages in addition to the previously described problems with a vertical staff. First, the full collar fastened about the tree trunk tends to strangle the tree and to prevent the passage of vital tree-growing fluids from the root system upward through the xylem layer to the limbs of the tree. Vital fluids pass upward and downward in the cambium layer just under the bark of the tree, and where this fluid flow is restricted by a close-fitting fully-encircling collar, the development of the tree is retarded. Secondly, the rigid outer collar of the guying system requires physical disengagement from the tree trunk after the tree has reached a self-supporting size. Although this is not a serious problem with isolated tree guying systems, the extra manpower required for disengaging a large number of rigid collars in an area of widespread landscaping gives rise to excessive costs.

U.S. Pat. No. 2,501,255 granted to R. O. Bell discloses an elongated split collar for straightening a tree trunk. This collar encompasses not only the full circumference of the tree but an extensive vertical section thereof and is held together with a pair of rigid "C" clamps. The extensive coverage of the tree trunk by the tightly squeezed rigid collar halves will seriously affect the development of the tree during its young life and further requires the aforesaid additional manpower to remove the guying system after sufficient growth is accomplished.

U.S. Pat. No. 3,226,822 to J. P. Lichtenthaler discloses a resilient strip of material used to lash a vertical staff against a tree trunk. In addition to the disadvantages of using a vertical staff adjacent a tree trunk that penetrates through the developing root system, when the strip is tightly wrapped around the tree trunk, it reduces fluid flow in the xylem layer and adversely affects tree growth, and when the strip is loosely or partially wrapped around the tree trunk, it will abrade the tree as the tree moves, as in the wind damaging the bark and making the tree susceptible to disease and fungal and/or insect attack.

U.S. Pat. No. 3,505,761 granted by J. Prieur discloses another type of tree support for use with a vertically oriented staff pounded into the ground adjacent the tree trunk. This support has a combination of the previously discussed disadvantages.

All of these patents exhibit the underlying disadvantages of adverse effects on tree health and/or tree growth combined with the requirement for extra manpower to remove the system from the tree after sufficient tree growth is present.

This invention eliminates both the serious cambium layer strangulation problems of previous designs and the requirement physically to detach the tree support system from the tree after self-sufficiency has been attained. The invention comprises a low-cost tree guying system specifically involving a tree trunk collar that is held away from the trunk in concentric relation thereto by a plurality of inwardly projecting lugs of yieldable material contacting the tree with a very low surface area and that features a release mechanism that causes the collar to disengage from the tree trunk and fall to the ground after a predetermined amount of tree trunk expansion that is concomitant with the vertical growth of the tree to a height and size wherein it becomes self-supporting and proper rooting is assured. A similar type of collar is shown in U.S. Pat. No. 497,853 granted to James Wright, but that collar surrounds a supporting staff or upright rather than a tree trunk and, therefore, has no release mechanism. Once the tree guying system of this invention is affixed to the trunk of a tree, the tree will be able to root and grow normally and the collar of the guying system will disengage form the tree under the action of tree expansion alone thus eliminating the need for further personal attention.

SUMMARY OF THE INVENTION

This invention is a tree guying system comprising a resilient collar capable of closure to a substantially circular form around a plant stem, in the closed state having at least three yieldable uniformly space inwardly projecting lugs and being capable of opening substantially only by uniform pressure outward against said lugs. Preferably, the yieldable lugs that project from the inside of the collar contact the plant stem, usually a tree trunk, these lugs having small contact area with the tree trunk so as to interfere as little as possible with the flow of vital fluids in the cambium layer of said stem. The collar includes self-actuating means to enable it to open to allow it to disengage from the trunk after a predetermined expansion of the trunk due to tree growth. The object of this invention is to provide tree guying systems without the past problems of strangulation of the xylem layer and accompanied restriction in fluid flow by using a trunk-encircling collar with a plurality of small lugs that project from the inside of the collar and contact the tree trunk in small areas. A further object of this invention is to provide a tree guying system that does not require attention other than to assemble it around the trunk of a tree as the system will break away from the tree and fall to the ground after a predetermined period of time or expansion of the tree due to normal growth. These and other objects of the invention will become more clearly discernable to the reader upon reading the description of the preferred embodiment taken together with the drawings that are appended hereto and the invention is further delineated in the claims that are appended hereto and made a part of this application.

DESCRIPTION OF THE DRAWINGS

FIG. 5 is a close-up view of another embodiment of collar release means.

FIG. 6 is a close-up view of another embodiment of collar release means.

FIG. 7 is a close-up view of another embodiment of the collar release means shown in FIG. 2.

FIG. 8 is a close-up view of another embodiment of collar release means.

FIG. 9 is a close-up view of another embodiment of collar release means.

FIG. 10 is a side view of the embodiment shown in FIG. 9.

DESCRIPTION OF THE PREFERRED EMBODIMENT

Figure 1:
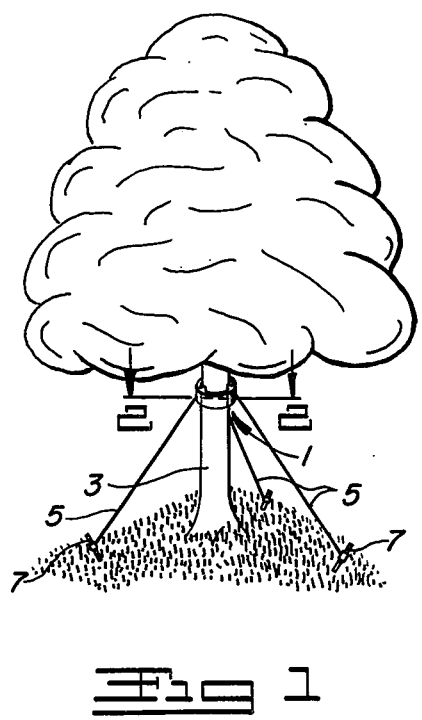
FIG. 1 is a general perspective view of the tree-guying system of this invention as used or applied to a tree.
Figure 2:
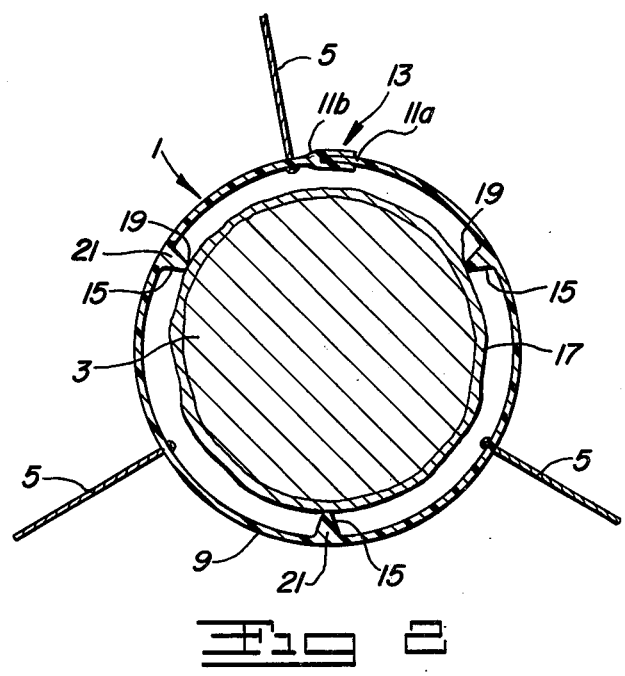
FIG. 2 is a transverse sectional view of a collar of this invention taken along the lines 2—2 in FIG. 1.

FIG. 1 shows the guying system of this invention as applied to an average tree. A substantially circular collar 1 positioned around a tree trunk 3 is attached to the ground or other immoveable surface or object by guy wires 5 through anchor pins 7 or other devices. In FIG. 2, collar 1 is shown to be made from a resilient rather rigid elongated strip 9 having a pair of opposed ends 11a and 11b that are joined together by an engagement means 13 about which more will be described later. Strip 9 can be made of metal, plastic or rubber, depending upon many factors such as tree compatibility, tree trunk size, expected wind velocities, etc. It is not necessary that the material of strip 9 be elastic but that the collar 1 formed by the strip 9 be resilient in its substantially circular form. A plurality of yieldable lugs or fingers 15 are attached to collar 1 spaced equidistant therearound and are in abutting engagement with the bark 17 of trunk 3.

Lugs or fingers 15 are made of a yieldable material such as rubber or flexible foam or flexible plastic to permit movement of the tree trunk 3 without chafing the bark 17 or the cambium layer thereunder and are generally of equal size so as to hold collar 1 in concentric spaced-apart relationship to trunk 3. Lugs 15 may be attached to collar 1 by any conventional means such as glue or rivets or they may even be made as part of collar 1 such as by conventional dual-durometer molding. They can be solid or hollowed out and are generally spaced equidistant about tree trunk 3 to maintain concentricity under varying directional wind loading.

Lugs or fingers 15 are shown to have a smaller contact area with tree trunk 3 than with collar 1 and, in FIG. 2, are shown to be of a generally three-dimensional trapezoidal configuration where the smaller end 19 thereof contacts the bark 17 in a singularly smaller area than the larger end or base 21 of the trapazoidal contacts collar 1. This configuration provides adequate support for collar 1 and yet does not depress or break through the bark 17 and strangle xylem layer to the extent that the vital fluids are restricted in their vertical travel along trunk 3. These lugs 15 can be rounded at the smaller end 19 if desired. The number of lugs or fingers 15 that may be used in any specific embodiment of this invention may vary depending upon different factors such as the initial diameter of tree trunk 3 when the tree guying system is first attached thereto or upon the initial strength of tree trunk 3 when the tree is first planted and guyed. It is important to space collar 1 apart from and concentric to tree trunk 3 so that horizontal winds do not sway it into contact with collar 1 which would then abrade the bark 17 and cause a leak or break in the xylem layer deleterious to the growth of the tree. Similarly, the collar should fit the tree trunk sufficiently snugly to avoid excessive rubbing of the lugs against the bark which can break the bark and make the tree more susceptible to disease and fungal and/or insect attack particularly after the collar disengages and falls away from the tree trunk.

The configuration of lugs 15 can be such that the vertical distance of lug contact end 19 with the bark 17 is more or less the vertical distance of base 21 with collar 1. It is more important to minimize circumferential contact of the end 19 with the bark 17 because it is the circumferential contact which upon depression or puncturing of the bark 17 will break or strangle the cambium layer inhibiting fluid flow therein. The vertical contact distance of lug end 19 with bark 17 is therefore not as important as it does not significantly inhibit the flow of such fluids in the cambium layer as would the expansion of the circumferential contact area of lug end 19.

While the collar may stay in position on the tree trunk held simply by the grip of the collar on the trunk, it is preferable to place the collar above the first limb or other natural protuberance on said trunk.

Guy wires 5 can be attached to collar 1 at any point desired therealong as within the skill of the art through either direct tying or by casting flanges or other connection adapters into collar 1.

Figure 3:
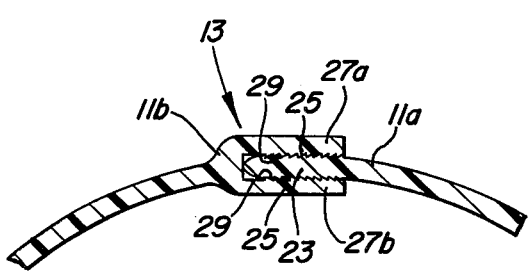
FIG. 3 is a close-up view of the collar release means shown in FIG. 2.

FIG. 3 shows one embodiment of engagement means 13 and shows strip end 11a formed into a tab 23 having a pair of opposed serrated faces 25. The other strip end 11b is formed into a pair of parallel tabs 27a and 27b that have serrations 29 formed in their opposed faces. To affix collar 1 to a tree trunk, one merely slips strip 9 around the tree trunk and inserts tab 23 in between tabs 27a and 27b so that the serrations on the mating faces of the tabs interlock to form a tight fitting. As tree trunk 3 expands in diameter due to growth, the expansion force is transmitted uniformly through all the lugs 15 and converted into a circumferential tensile force or stress along strip 9. Thus, the collar should be sufficiently resiliently deformable from its circular shape to remain intact or engaged under unilateral stress or even multilateral stresses caused by lateral movement of the tree trunk but should disengage under uniform stress caused by expansion of the tree trunk. By adjusting the depth of the serrations, the separation distance between tabs 27a and 27b and the size of lugs 15, one can easily and accurately program means 13 to disengage under a predetermined circumferential collar stress. Upon reaching this stress, tab 23 pulls out of engagement between tabs 27a and 27b and collar 1 falls harmlessly to the ground, and the tree trunk is no longer encased in the guying system.

Figure 4:
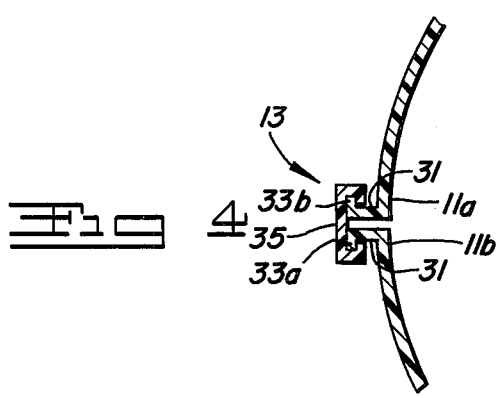
FIG. 4 is a close-up view of another embodiment of collar release means.

FIG. 4 shows another embodiment of engagement means 13 and shows strip ends 11a and 11b formed into a pair of mutually faced apart or reversed "C" bands 31 terminating in faced apart lips 33a and 33b respectively. A "C" shaped clip 35 made of a frangible material is slipped over lips 33a and 33b to engage and encase them and to lock "C" bends 31 together and hold collar 1 to tree trunk 3. Upon expansion of tree trunk 3, the tensile stress created in strip 9 forces reverse "C" bends 31 apart. Clip 35 can be designed, by known engineering methods, to rupture at a predetermined stress applied to it by reverse "C" bends 31 and thus permit engagement means 13 to disengage and allow collar 1 to part and fall away from tree trunk 3 at a predetermined trunk expansion.

FIG. 5 shows another embodiment of engagement means 13 and shows strip ends 11a and 11b to be formed into a pair of outwardly projecting parallel flanges 37a and 37b respectively having aligned apertures 39 formed therein that are fastened together by conventional pin means such as bolt 41 and nut 43. A release pin 45 is slidably received between flanges 37a and 37b interior of bolt 41 and comprises a pin head 47, positioned near bark 17, that is attached to a cutter edge 49, positioned near bolt 41, through a pin body 51. Expansion of three trunk 3 forces the bark 17 against pin head 47 and slides pin body 51 and cutter edge 49 against bolt 41 thereby cutting bolt 41, releasing strip and flanges 37a and disengaging strip 9 or collar 1 from trunk 3. In this embodiment, the length of release pin 45 determines the release time of means 13.

FIG. 6 shows still a further embodiment of means 13 and shows strip ends 11a and 11b formed into outwardly projecting parallel flanges 53a and 53b respectively. This embodiment is similar to that shown in FIG. 6 in that release pin 45 is slidably received between flanges 53a and 53b except that cutter edge 49 is merely an engagement edge 50. In place of conventional pin means to hold the flanges together, a "C" shaped clip 55 is slidably engaged or slipped over the outer surfaces of flanges 35a and 35b to hold them together. Expansion of trunk 3 pushes bark layer 17 against pin head 47 that in turn pushes pin body 51 and engagement edge 50 against the inside of "C" clip 55 sliding it off of the flanges 53a and 53b thus releasing strip 9 or collar 1 from tree trunk 3.

FIG. 7 shows a further embodiment of engagement means 13 and shows strip end 11a formed into a partial ball 63 that is received in a partial socket 65 formed in strip end 11b to become a releasable ball and socket joint 67. Tree trunk expansion, converted as aforesaid into circumferential stress, will cause ball and socket joint 67 to disengage and release collar 1 after a predetermined tree growth has been reached.

FIG. 8 shows a still further embodiment of means 13 and shows strip end 11a of collar 1 to be formed into a tab 69 that is slideably received between a pair of parallel tab ends 71a and 71b that are formed in the other end of strip end 11b. A biodegradeable glue or adhesive is applied to the contact area 73 between tab ends 69 and 71a and 71b to fix the ends together into a tightly bound joint. The aforesaid glue can be compounded with skill presently known in the art to degrade into a non-adhesive degradant or in other words, lose its adhesive power after a predetermined period of time such as two years to allow the joint to open and release collar 1 from tree trunk 3.

FIG. 9 shows a still further embodiment of means 13 and shows strip end 11a of collar 1 to be formed into a tab 75 that is slideably received between a pair of parallel tab ends 77a and 77b that are formed in the other end of strip end 11b. In this embodiment, collar 1 is divided into a pair of half-collars, each end comprising a set of mutually engagable tab sets as aforesaid. Said tabs 75, 77a and 77b have formed therein at least two apertures 79 that are in mutual alignment when the tab ends are assembled to form collar 1.

A clip 81 (see FIG. 11) comprising a pair of opposed parallel long segments 83 joined to a pair of opposed parallel short segments 85. The length of the inside of clip 81 in the long direction is slightly greater than the width of collar tab ends 75 and 77a and 77b. The length of short segments 85 is greater than the thickness of engaged tab ends 75, 77a and 77b. A pair of rivets or studs 87 are anchored in one of the long segments 83 having their stems extending inward of clip 81. Clip 81 is slidably received over tab end 77b and arranged to move inward and outward. When assembled, the stems of rivets 87 extend through apertures 79 in tab ends 77a and 75 when clip 81 is pushed to its innermost position. At its outermost position, the stems of rivets 87 slide out of apertures 79 in tab end 75 thus releasing the tab ends.

Clips 81 are moved into their outermost position at each end of the collar halves, the halves assembled together to encircle the tree trunk, to form collar 1, and the tabs mutually engaged. Clips 81 then are pushed inward to engage rivet stems 87 into apertures 79 and lock collar 1 around the tree trunk. As the diameter of the tree trunk expands through growth, it slides clip 81 outward to move rivet stems 87 out of apertures 79 in tab end 75 thus freeing the tab end to disengage and release collar 1 from the tree trunk.

I claim:

1. A collar capable of closure to a substantially circular form around a tree trunk, in the closed state comprising a strip having at least three inwardly projecting lugs, all of said lugs being substantially, uniformly spaced apart about said collar and being more yieldable than the tree trunk, said collar having means holding said strip in a closed state and for disengagement from said tree trunk by tree growth and concomitant tree trunk expansion.

2. The collar of claim 1 wherein said collar is resilient.

3. The collar of claim 2 including means for anchoring said collar to an immovable surface.

4. A collar in accordance with claim 2 wherein each of said lugs on said collar has a greater cross-sectional area at the collar than at the free extremity.

5. The collar of claim 1 including means for anchoring said collar to an immovable surface.

6. The tree guying system of claim 1 wherein said means for disengaging said collar comprises a pair of mutually outwardly-facing parallel flanges formed in the respective ends of said strip, a "C"-shaped clip encasing and engaging the outer surfaces of said flanges to hold said flanges together, a release pin slidably received between said flanges interior of said clip, said pin comprising a pin body having an edge at one end thereof adjacent said "C"-shaped clip and a pin head at the other end thereof adjacent the xylem layer of the tree trunk so that expansion of the tree trunk will cause said release pin to be pushed outward against said clip and slide said clip off of said flanges and release said collar from the tree trunk.

7. The tree guying system of claim 1 wherein said collar is formed of a pair of half-collar strips:
   a. one end of said strip being formed into a tab adapted to be received between a pair of parallel tabs formed in the other end of said strip;
   b. said tab ends forming at least a pair of apertures that are in mutual alignment when said tabs are mutually assembled;
   c. a clip comprising a pair of opposed, parallel, long segments joined to a pair of opposed, shorter segments, the lengths of said segments arranged such as to allow said clip to be slidably received over said assembled tabs and slide inward and outward of said collar; and,
   d. at least a pair of rivets anchored to one long segment arranged to have the stems thereof inserted into said apertures such that when said tabs are mutually engaged and said clip is moved inwardly, said rivets hold said tabs together and as the tree trunk expands it moves said clip outward releasing said rivets from said tab apertures and releasing said collar.

8. A collar in accordance with claim 1 wherein each of said lugs on said collar has a greater cross-sectional area at the collar than at the free extremity.

9. In a tree guying system of claim 1 wherein said lugs are of three-dimensional trapezoidal shape having the smaller end thereof abutting the tree and the base thereof affixed to said collar.

10. The tree guying system of claim 1 wherein said means for disengaging said collar comprises one end of said strip being formed into a tab adapted to be received between a pair of parallel tabs formed in the other end of said strip, the mating surfaces of said tabs having serrations formed therein to mutually engage and aid said tab ends in clasping together until a predetermined circumferential stress is reached in said strip, created by expansion of the tree trunk, to disengage said tab ends.

11. The tree guying system of claim 1 wherein said means for disengaging said strip ends after a predetermined expansion of the trunk, comprises a pair of mutually reversed "C"-shaped bends formed in the respective ends of said strip terminating in faced-apart lips, a frangible "C"-shaped clip encasing and engaging said faced-apart lips to hold said "C"-shaped strip ends together, said clip being designed to break at a predetermined stress conveyed thereto by said strip ends to be released and disengage said collar from the tree trunk.

12. The tree guying system of claim 1 wherein said means for disengaging said collar comprises a pair of outwardly facing parallel flanges formed in the respective ends of said strip and containing aligned apertures therein for receipt of pin means therethrough to fasten said flanges together, a release pin slidably received between said flanges interior of said pin means, said pin comprising a pin body having a cutter surface at one end thereof adjacent said pin means and a pin head at the other end thereof adjacent the xylem layer of the tree trunk so that expansion of the tree trunk will cause said release pin to be pushed outward against and fracture said pin means to release said flanged tab ends and disengage said collar from the tree trunk.

13. The tree guying system of claim 1 wherein said means for disengaging said collar comprises one end of said strip being formed into a partial socket to receive therein a partial ball shape formed at the other end of said strip to form a ball and socket joint to fasten said strip together, said ball and socket joint adapted to disengage and release said collar from the tree trunk at a desired circumferential stress in said strip.

14. The tree guying system of claim 1 wherein said means for disengaging said collar comprises one end of said strip being formed into a tab adapted to be received between a pair of parallel tabs formed in the other end of said strip, the mating surfaces of said tabs being coated with a biodegradable adhesive that will lose its adhesive properties after a predetermined period of time to release said tabs and disengage said collar from the tree trunk.

15. In a tree guying system comprising a tree trunk encircling and grasping collar and means for anchoring said collar to an immovable surface to hold the tree in a fixed position, said collar comprising:
   a. an elongated strip having opposed ends formed into said collar to encircle the tree trunk;
   b. a plurality of yieldable lugs attached to the inner surface of said strip to abut the tree trunk and hold it in concentric spaced-apart relation thereto, said lugs having a smaller contact area with the tree trunk than with said collar to permit the flow of vital tree-growing fluids vertically along the tree trunk; and,
   c. means on said strip for disengaging said collar from said tree trunk that is actuated by tree growth and concomitant trunk expansion.

* * * * *